C. NELSON.
COFFEE MACHINE.
APPLICATION FILED APR. 24, 1907.

1,111,029.

Patented Sept. 22, 1914.

Witnesses:
Jas. F. Coleman
John F. Porch

Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & CO., OF NEW YORK, N. Y., A COPARTNERSHIP COMPOSED OF SIGMUND STERNAU AND LIONEL STRASSBURGER.

COFFEE-MACHINE.

1,111,029.  Specification of Letters Patent.  Patented Sept. 22, 1914.

Application filed April 24, 1907. Serial No. 369,922.

*To all whom it may concern:*

Be it known that I, CHARLES NELSON, a subject of the King of Sweden, residing in the borough of Brooklyn, county of Kings and State of New York, post-office address No. 195 Plymouth street, Brooklyn, New York, have invented an Improvement in Coffee-Machines, (Case B,) of which the following is a specification.

The object I have in view is to produce a device for making infusions of coffee, and for analogous purposes, which device will have no moving or loose parts, which will operate in a minimum of time, which will produce an infusion before all the water in the apparatus is brought to a boil, and which can be readily cleaned and will be of cheap construction and durable in use.

I attain these objects by the mechanism illustrated in the accompanying drawings in which—

Figure 1:
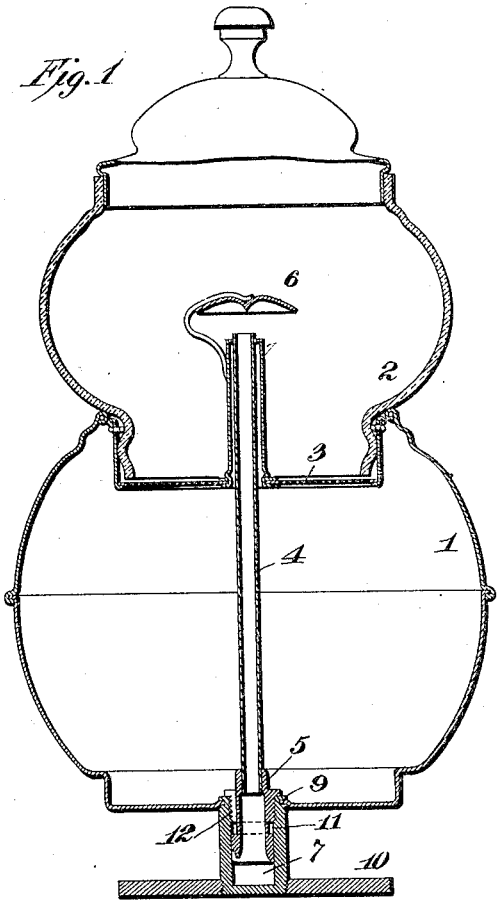
Figure 2:
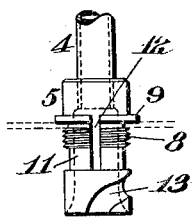
Figure 3:
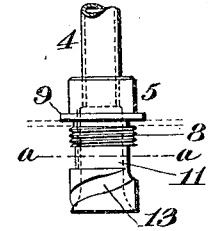
Figure 5:
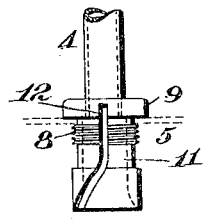
Figure 4:
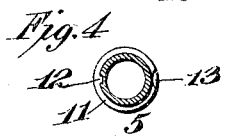

Figure 1 is a section of a portion of a coffee machine embodying my invention. Fig. 2 is a side view of the bottom portion of the percolator. Fig. 3 is a view of the same but taken at right angles to Fig. 2. Fig. 4 is a section on the line *a—a* of Fig. 3. Fig. 5 is a view similar to Fig. 2 of a modification.

In all of the views like parts are designated by the same reference characters.

In carrying out my invention, I provide the usual receptacle 1, which carries a globe 2 at the upper part thereof. From the globe depends the screen 3, which is used for carrying the material from which the essence is to be made. The percolator comprises a tube 4 and a tubular fitting 5 at the bottom thereof. The tube 4 is vertical and extends from the bottom of the receptacle 1 up through the center of the screen 3 and stops below a deflector 6, which is for the purpose of receiving and scattering the liquid which is forced up the tube 4 by the percolator, and scatter and sprinkle it over the material contained in the screen 3. The upper end of the tube is open. The tubular fitting rests within the chamber 7, which chamber is located below the bottom of the receptacle 1; the upper end of the chamber is open and communicates with the interior of the chamber. The chamber is circular in cross section and its capacity is small compared to the receptacle. The upper portion of the chamber is screw-threaded so as to engage with threads 8 on the tubular fitting 5. A flange 9 on the fitting makes a liquid-tight joint at that point. A plate 10, secured at the bottom of the chamber 7, is for the purpose of concentrating the heat from the spirit lamp or other device used for the purpose and prevent the bottom of the receptacle 7 from becoming heated.

The tubular fitting 5 extends some distance down into the chamber 7 and makes a close fit therewith. An annular groove 11 is formed in the fitting intermediate its ends, and this groove communicates with the interior of the receptacle 1 by means of a vertical groove 12 which is cut through the threads 8 and flange 9. This groove does not extend below the annular groove 11. A spiral groove 13 is formed on that portion of the tubular fitting below the annular groove 11 and serves as a means of communication between the bottom of the chamber 7 and the annular groove 11. The passage is thereby produced from the lower portion of the chamber 7 to the receptacle 1, which passage consists of the spiral groove 13, the annular groove 11 and the vertical groove 12. It will be noticed that the upper end of the spiral groove communicates with that portion of the annular groove 11 opposite to the vertical groove 12, as is shown in Figs. 3 and 4.

In the modification shown in Fig. 5, the annular groove 11 is omitted, the upper end of the spiral groove 13 communicating directly with the lower end of the vertical groove 12. In this modification also the vertical groove 12 does not extend entirely through the flange 9, but only partially so, the flange being somewhat thicker than that shown in the other embodiment of my invention.

I prefer to make the upper part of the fitting 5, above the flange 9, of some considerable thickness as shown in Figs. 2 and 3, or else to make the flange 9 of some thickness. This is for the purpose of producing a heat insulator or jacket between the inside of the chamber 7 and the receptacle 1.

The operation is as follows: The receptacle 1 is partially filled with water, and the screen 2 with coffee or other material of which it is desired to secure an infusion. Heat being applied to the bottom of the chamber 7 and a plate 10 will heat the water contained in the chamber. This water will have entered the chamber through the passage formed in the vertical groove 12, annular groove 11 and spiral groove 13, and will stand in the vertical groove 4 at the same level or slightly higher than the level of the liquid within the receptacle 1. The difference in the level between the liquid in the tube 4 and receptacle 1 will be due entirely to capillary action. The contents of the chamber 7 will now be heated, which will expand the liquid, and also produce steam below the liquid sufficient to drive the liquid up the tube 4 to the deflector 6, where it will be sprayed and scattered over the contents of the screen 3. The liquid remaining in the percolator will settle back in the tube 4, other liquid will enter the bottom of the chamber 7 through the grooves 11, 12 and 13, and the operation will be again repeated.

The size of the chamber is such that it is so small that liquid will not circulate within it to any extent before it has time to be brought to such a degree of temperature that the liquid will be driven up to the tube 4. The irregular passage formed by the grooves 11, 12 and 13, is of such small cross-section and has so many angles that the liquid will meet with more resistance in being driven up through such passage than being driven up the tube 4; consequently, the greater portion of the liquid driven out of the chamber 7 will be driven up the tube 4. This passage may be defined as a labyrinth passage, serving as it does as a baffling device to prevent the ready traverse of liquid at high speed while permitting it to freely enter the chamber from the receptacle. The thick metal forming the upper part of the fitting or the flange 9 acts as an insulator and prevents the water or liquid in the bottom of the receptacle 1 from becoming heated.

By my device I have produced an apparatus for making an infusion of coffee or other material which will have no moving parts, which can be readily cleaned by separating the fitting from the chamber, and which will be cheap to construct and durable.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described the nature of my invention and in what manner the same is to be performed, what I claim and desire to secure by Letters Patent is:

1. In a coffee machine, the combination with a receptacle having an open-ended chamber communicating therewith, of a percolator within the chamber, the said chamber and percolator being secured together by interacting screw threads, a groove, and a passage affording communication between the receptacle and the chamber, the said passage being formed across the screw threads.

2. A percolator for a coffee machine which comprises a tube and a member secured thereto, the said member having a vertical groove and a spiral groove communicating therewith, the two grooves constituting a liquid passage in combination with a heating chamber which forms one wall of the passage.

3. A percolator for a coffee machine which comprises a tube and a member secured thereto, the said member having a vertical groove on one side and a spiral groove on the other, and means for allowing communication between the vertical and spiral grooves.

4. A percolator pot comprising a main chamber, a heating chamber, a percolator tube fitting into said chamber, and means between the outer wall of the lower end of said tube and the inner wall of said heating chamber providing a tortuous passage between said main and heating chambers.

5. In a percolator pot, a main chamber, a heating chamber, a percolator tube fitting into said heating chamber, the outer wall of the lower end of said tube being so constructed as to form with the inner wall of said heating chamber a tortuous passage between said main and heating chambers.

6. In a percolator pot, a main chamber, a heating chamber, a percolator tube having an enlarged lower end fitting into said heating chamber, a tortuous groove formed in the outer wall of said enlarged end and forming with the inner wall of the heating chamber a tortuous passage between said main and heating chambers.

7. In a percolator pot, a main chamber, a heating chamber appended thereto, a percolator tube having an enlargement at its lower end adapted to fit into said heating chamber, said enlargement having a tortuous passage formed in its outer wall to afford communication between said main and heating chambers, and having a recess forming a part of said heating chamber.

8. In a percolator pot, a main chamber, a heating chamber appended thereto, a percolator tube having an enlargement on its lower end arranged to fit into said heating chamber, said enlargement having a tortuous groove formed on its outer wall arranged to form a communicating passage between said main and heating chambers in conjunction with the inner wall of said heating chamber.

This specification signed and witnessed this 22nd day of April, 1907.

CHARLES NELSON.

Witnesses:
JOHN S. LOTSCH,
EDWARD IRMSCHER.